April 17, 1934.     M. REIFFENSTEIN     1,955,683
WATER POWER ENGINE
Filed Sept. 21, 1931     2 Sheets-Sheet 1
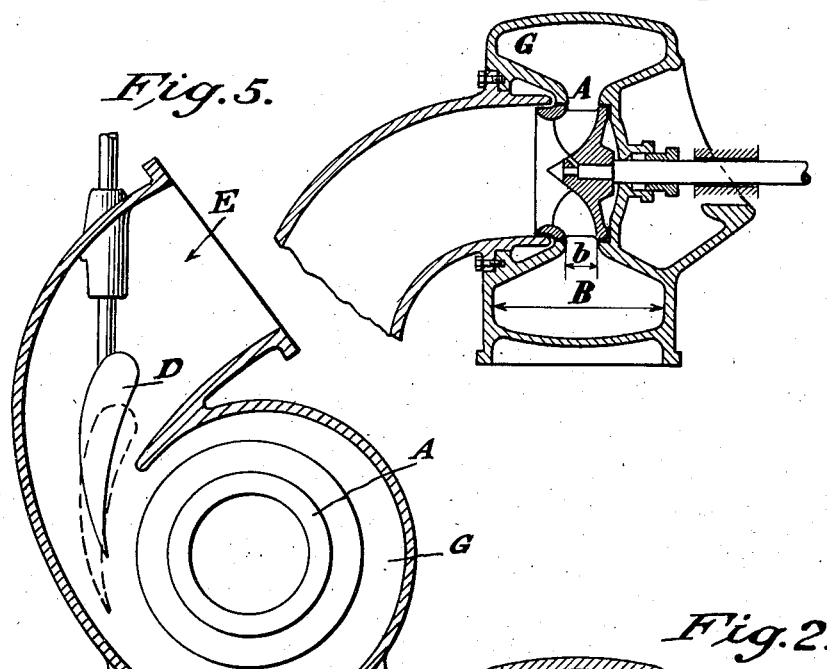
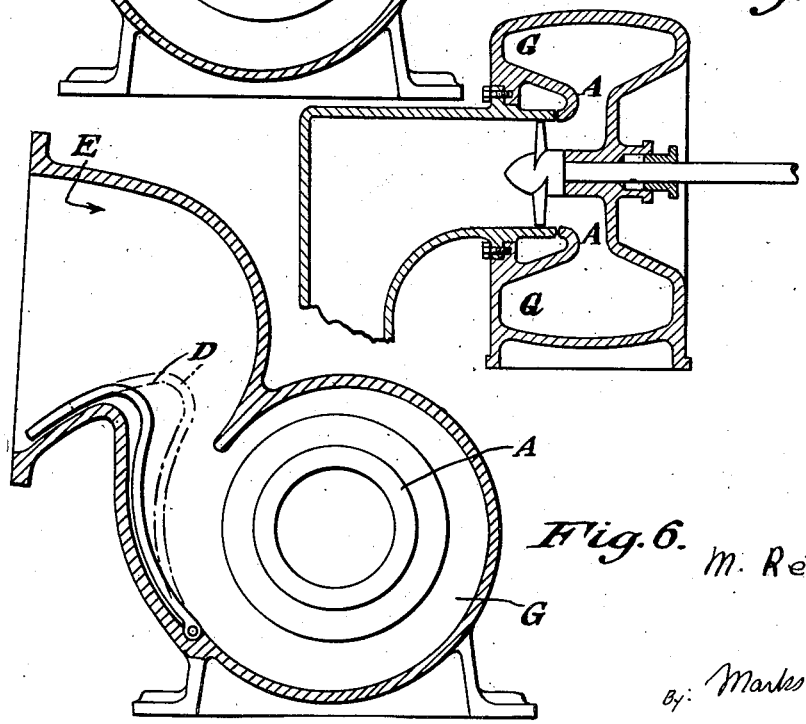
M. Reiffenstein
INVENTOR
By: Marles & Clerk
ATT'YS.

April 17, 1934.  M. REIFFENSTEIN  1,955,683
WATER POWER ENGINE
Filed Sept. 21, 1931  2 Sheets-Sheet 2

M. Reiffenstein
INVENTOR
By: Marks & Clerk
Attys.

Patented Apr. 17, 1934

1,955,683

UNITED STATES PATENT OFFICE 1,955,683

WATER POWER ENGINE

Manfred Reiffenstein, Vienna, Austria

Application September 21, 1931, Serial No. 564,202
In Austria September 26, 1930

3 Claims. (Cl. 253—124)

This invention relates to improvements in water power engines.

Cross reference is made to applicant's copending application #702,246, filed December 13, 1933.

The conventional reaction turbine working in conjunction with a draft tube uses now a speed ring with adjustable guide vanes to control the flow through the turbine. Each guide vane is fitted with a stem that rotates in two bushings, the whole set of guide vanes being adjusted together by the means of a shifting ring and link work or the like.

The purpose of the speed ring is not only to control the flow but also to give to the incoming stream the proper radial and axial components of the velocity. The adjustable speed ring is the most complicated and expensive part of the turbine and requires a lot of machining and besides its working through quite efficient at some gate openings is never trouble free. It has been shown recently both by theory and experiment that secondary vortices are induced in each guiding canal and those vortices not only reduce the efficiency of the turbine but also may cause or aggravate conditions where cavitation takes place. Besides in many types of reaction turbines foreign matter such as weeds, ice etc. may clog the speed ring canals while they could easily pass through the runner itself.

It has been known for a long time that for a given load or discharge a turbine with a well designed scroll case and without speed ring either fixed or adjustable gives a good efficiency, but all attempts to control efficiently the discharge with a single device have fallen short of their purpose and that is how the conventional adjustable speed ring was brought out.

The previous attempts to control the flow of the scroll were in most cases obtained with a wicket or sluice at the inlet orifice of the scroll and with such devices control could be done only by throttling.

The present invention considers a reaction turbine without speed ring with a scroll case undivided by partitions, running full of water and surrounding the runner or the runner inlet transition space according to the type of runner which may be of any conventional reaction turbine type.

In this turbine the discharge is effectively controlled by a special device at the inlet portion of the scroll which enable an effective and efficient control of the flow without throttling for a large range of discharge. A forced vortex is thus formed by the combined action of scroll and control device and is lead to the runner without any free surface.

In the accompanying drawings are illustrated diagrammatically sectional views of some modes of carrying out the present invention.

Fig. 1 shows a water power engine with Francis-runner, and

Fig. 2 a water power engine with Kaplan-runner.

Figs. 5 and 6 are sectional views of two modified constructions of the spiral shaped casing provided with an adjusting device.

As shown in Fig. 1, the water power engine according to the present invention consists of a spiral shaped casing G which is contracted inwardly to form a cylindric annular compartment A in front of the runner. The water enters tangentially the spiral shaped casing and therein automatically forms a forced vortex where the tangential velocity increases in the inversed proportion of the radius when approaching the centre. The individual flow lines in the spiral shaped casing are in the form of substantially flat logarithmic spirals. Therefore in order to generate the required angle of admission into the runner it is necessary to reduce the width B of the spiral shaped casing to the width b of the annular compartment A in front of the runner, in order to increase in the same proportion the radial velocity of the water. In view thereof the water describes steeper logarithmic spirals in the annular compartment A, whereby the necessary angle of entry into the runner is generated by the suitable choice of the proportion between B and b. After flowing through the runner, the water passes in known manner into the lower part of the water by way of the suction pipe.

Fig. 2 shows the application of the invention in connection with a water power engine provided with a Kaplan runner. The flow of water in the spiral shaped casing G and in the annular compartment A in front of the runner passes in the same way as above described, e. g. the water circulates in the compartment A in a comparatively steep logarithmic spiral and therefore shows tangential and radial velocity components and its flow exactly corresponds to the flow which heretofore was controlled by the guide apparatus. Hereafter this vortex is guided by the usual shape of the bottom of the annular compartment in front of the runner and of the runner-boss in the case of propeller-turbines, in order to axially charge the runner. Runner and suction pipe connection are of common construction.

Figure 3:
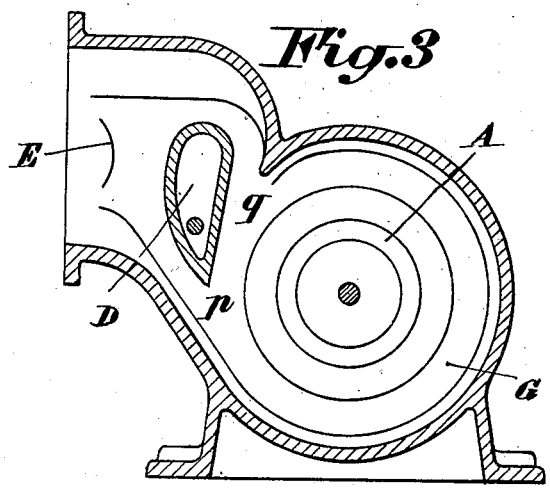
Fig. 3 is a sectional elevation through the spiral shaped casing provided with an adjusting device.

Fig. 3 shows in longitudinal section a spiral shaped casing without runner but provided with a regulating device in the shape of a rotatable control device D. The water enters the casing by way of the inlet E and passes on both sides of the vane D, at $p$ and $q$, tangentially into the spiral shaped part of the casing G. The rotatable vane rests on the side walls of the casing and is wing-shaped and can be turned from outside, in order to modify the flow characteristics and the discharge without effecting a loss of energy by a throttling action for a long range of discharge. In open position the inner face of known regulating device does not break the continuity of the scroll wall and must be built so, that at every discharge the whirling water in the scroll meets the incoming water without shock, losses and dead water spaces. Thus it is possible to vary the quantity of the admitted water and the flow of the turbine. The rotatable vane D may be hydraulically balanced, so that a very small force is necessary only for regulating purposes.

Figure 4:
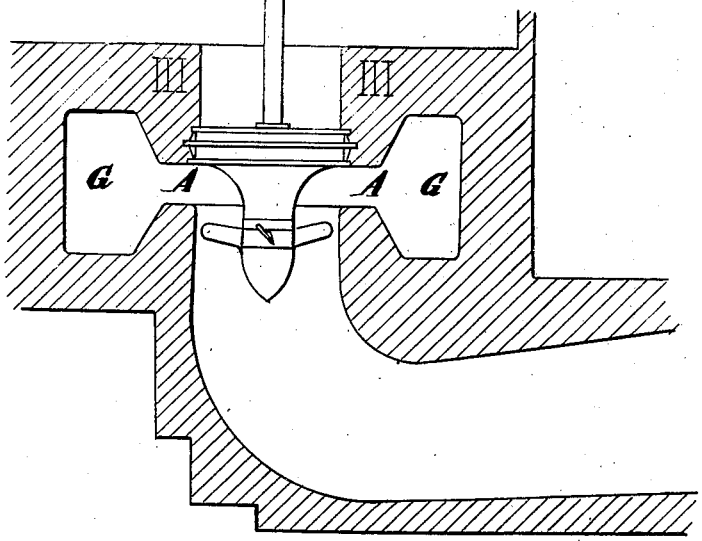
Fig. 4 is a sectional view of a turbine with vertical shaft and with the spiral formed in concrete.

Fig. 4 shows a water power engine for large quantities of water and a small head. The spiral shaped casing and suction pipe are built in concrete and a propeller is used as runner.

The shape of the spiral depends on the quantity of water on which the calculation is based. For instance if the calculation is based on one half of the maximum quantity of water, the vortex is preferably symmetrical at the runner inlet or inlet compartment at half discharge. Slight dissymetry of the vortex, which is practically of no consequence, results in the case of a full or quarter charge.

The efficiency in the case of a very small charge is superior to that of a Francis-turbine with guide apparatus, if the spiral is designed for say one third of the usual flow and the turbine is provided with a Francis-runner.

The spiral is, of course, designed for a flow of the maximum-efficiency, thus practically for the full flow of the turbine in the event of propeller-turbines with abrupt efficiency curve.

The regulation of the water-inlet may be controlled also in another manner than that shown in Fig. 3. For instance the regulation at the inlet portion of the spiral may be carried out by means of a slide (Fig. 5), a flap hinged to the wall (Fig. 6) and so forth.

In view of the dispensing of the guide apparatus, the water power engine according to the present invention has the following pecularities and advantages:—

1. Increased efficiency,
2. Simple and inexpensive construction,
3. Small tendency of choking by foreign matter,
4. Small regulation power, small and inexpensive regulators.

Any expenses for carrying out experiments with runners are dispensed with as long as the Francis-, Kaplan- and propeller runners of known construction can be used with the turbine built according to the invention.

I claim:—

1. In a reaction turbine with a scroll case running full of water without partitions or speed-ring whereby the water freely whirls round to the runner, a runner, and a single regulating device at the inlet portion of the scroll, said regulating device being shaped and disposed to maintain the continuity of the scroll wall of the case when in very slightly open position.

2. In a reaction turbine with a scroll case running full of water without partitions or speed-ring whereby the water freely whirls round to the runner, a runner, and a single regulating device at the inlet portion of the scroll, said regulating device being shaped and disposed to maintain the continuity of the scroll wall of the case when in very slightly open position, said regulating device including a stream lined vane washed by water on both sides.

3. In a reaction turbine with a scroll case running full of water without partitions or speed-ring whereby the water freely whirls round to the runner, a runner, and a single regulating device at the inlet portion of the scroll, said regulating device being shaped and disposed to maintain the continuity of the scroll wall of the case when in very slightly open position, said regulating device including a flap hinged on the scroll wall.

MANFRED REIFFENSTEIN.